Aug. 28, 1934.  N. H. MANN  1,971,722
ANIMATED MOTION PICTURE
Filed Sept. 6, 1928    2 Sheets-Sheet 1
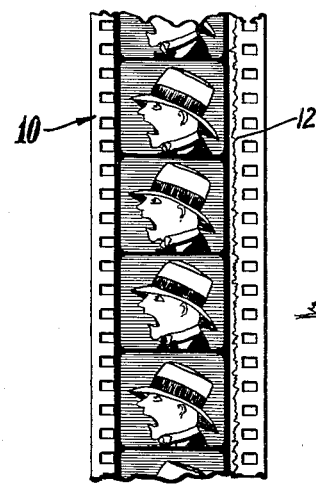
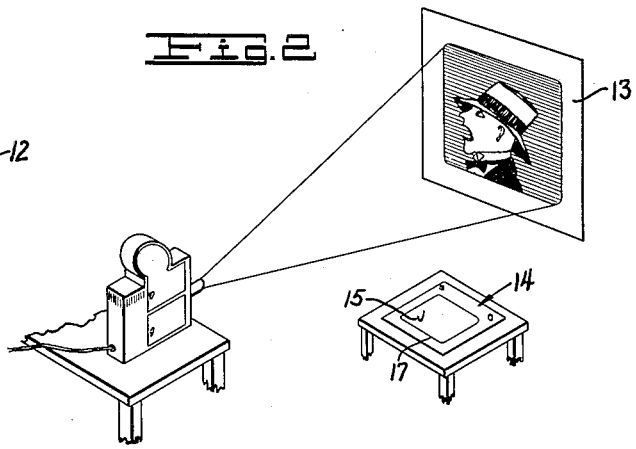
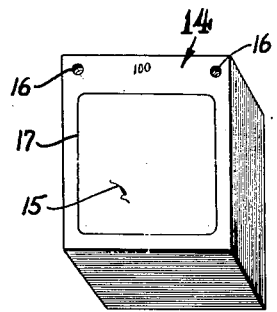
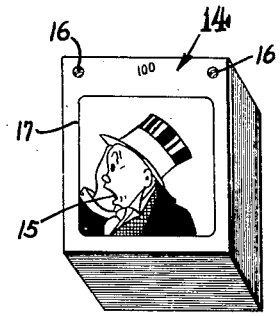
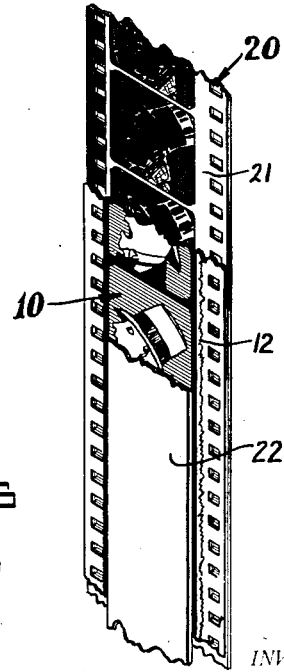
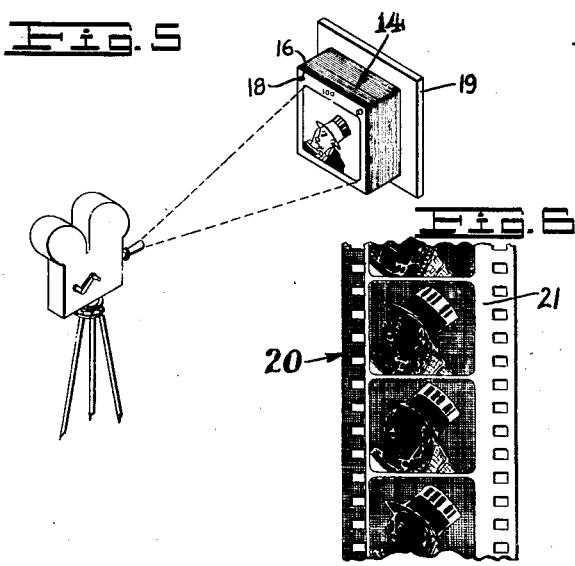
INVENTOR.
N. H. MANN.
BY
ATTORNEY.

Aug. 28, 1934.   N. H. MANN   1,971,722
ANIMATED MOTION PICTURE
Filed Sept. 6, 1928   2 Sheets-Sheet 2
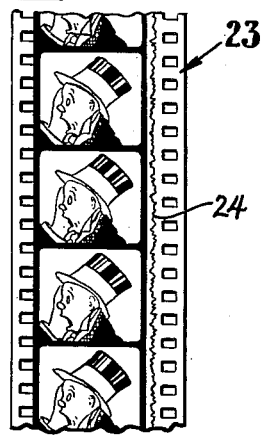
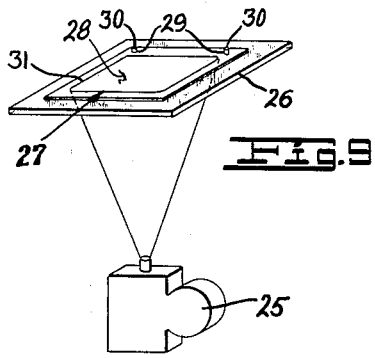
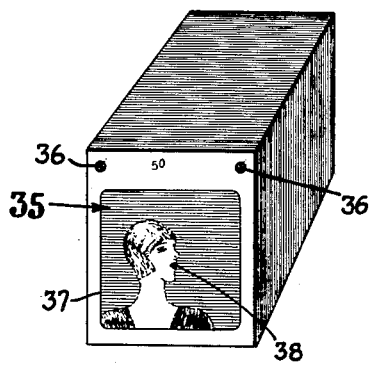
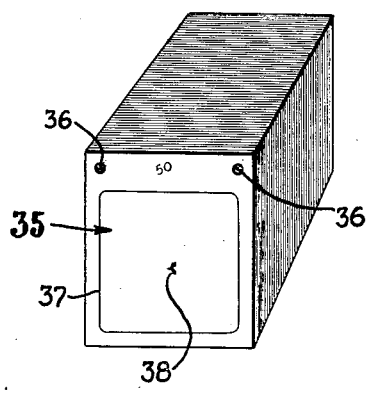
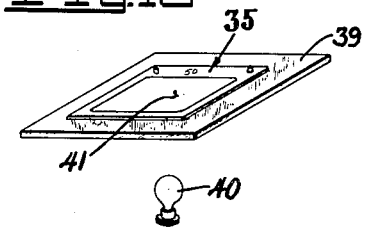
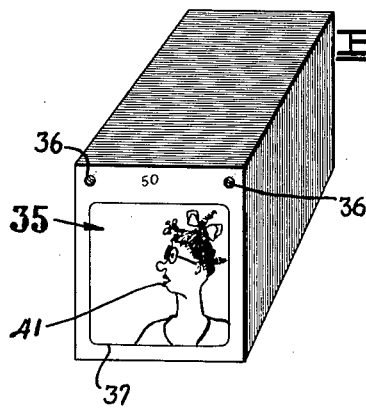
INVENTOR.
N. H. MANN.
BY
ATTORNEY.

Patented Aug. 28, 1934

1,971,722

UNITED STATES PATENT OFFICE 1,971,722

ANIMATED MOTION PICTURE

Ned H. Mann, Los Angeles, Calif.

Application September 6, 1928, Serial No. 304,197

7 Claims. (Cl. 88—16.2)

This invention realtes to improvements in animated motion pictures.

The general object of this invention is to produce a "talking" animated motion picture.

Another object of the invention is to provide means whereby a human voice or sounds may be correctly synchronized with an animated motion picture.

A further object of this invention is to provide a means whereby a "talking" motion picture can be produced wherein objects incapable of human speech or other sounds are made to appear to utter speech or other sounds.

Other objects and the advantages of this invention will be apparent from the following description taken in connection with the accompanying drawings wherein:

Fig. 1 is a view of a fragment of motion picture film of an actor having the sound or voice chart thereon.

Fig. 2 is a diagrammatic view showing the method of projecting one frame at a time of the film shown in Fig. 1 and copying the actor's lips in each frame movement upon a card.

Fig. 3 is a perspective view of a plurality of cards having the copied lip movement thereon.

Fig. 4 is a view similar to Fig. 3 showing the cards with the cartoon drawn about the lip movement.

Fig. 5 is a diagrammatic view showing the method of photographing each of the cards shown in Fig. 4 upon a single frame of a motion picture film.

Fig. 6 is a view of a fragment of negative film after the cards have been photographed thereon.

Fig. 7 is a view of the fragment of negative film shown in Fig. 6 and the master postive shown in Fig. 1 showing the manner of printing the voice chart on the negative.

Fig. 8 is a view of a fragment of postive film made from the negative shown in Fig. 6.

Fig. 9 is a diagrammatic view showing another method of copying the lip movement on a card.

Fig. 10 is a perspective view of a plurality of cards having a photograph of a person thereon.

Fig. 11 is a view similar to Fig. 10 showing the cards after the lips have been inked in and the remainder of the photograph washed away.

Fig. 12 is a diagrammatic view of another method of copying the lip movement from the cards shown in Fig. 10 and Fig. 13 is a perspective view of the cards after an animated figure or cartoon has been drawn on the cards.

As previously stated, my invention is directed to the production of motion picture cartoons wherein the characters are made to talk or utter sounds.

To make a talking animated motion picture with my system a motion picture is taken of an actor or character and the voice registered on the film in any of the well known methods. From the negative thus taken a master positive 10 including the voice chart 12 is made as shown in Fig. 1.

Each frame of the film 10 is projected upon a screen 13 as shown in Fig. 2 and an artist copies the lip movement upon a card 14 or other object as indicated at 15. Each of the cards 14 may be provided with gauge holes 16 which are in exactly the same relationship to the frame space 17 upon each card and the cards are consecutively numbered. If desired in lieu of the gauge holes other expedients may be employed to correctly center the cards.

After the lip movement has been copied upon the cards 14 as shown in Fig. 3, the artist fills in the cartoon to match the lip movements as shown in Fig. 4. When the cartoons have been drawn on the cards to show proper animation the cards 14 are centered as by being placed on gauge pins 18 on a support 19 which pass through the gauge holes 16 in the cards as shown in Fig. 5. The cards 14 are then successively photographed as shown in Fig. 5, one card at a time, each upon a separate single frame of a negative film 20 as shown in Fig. 6.

The portion 21 on the film 20 which corresponds to the voice chart portion 12 on the master film 10 is matted out when the cards are being photographed so that this space is unexposed. The master film 10 is then placed over the negative film 20 so that the lip action in the frames of each film correspond and all but the voice chart 12 of the master film is matted out as indicated at 22 in Fig. 7. The voice chart 12 on the master film 10 is then printed on the negative 20. From this negative a complete animated positive film 23 having a voice chart 24 thereon is printed as shown in Fig. 8, which when projected will produce an animated talking motion picture, wherein the voice will synchronize with the lip movement of the character shown.

In Fig. 9 I have shown another method for copying the lip movement from the master film. As shown the master film is projected one frame at a time by means of a projector 25 through a translucent member 26 onto a translucent card 27. The lip movement is then copied upon the card on the side opposite from which the picture is projected as indicated at 28. The card 27 is similar to the cards 14 having gauge holes 29 in which gauge pins 30 on the member 26 are adapted to be positioned and having a frame space 31.

The same result may be obtained by projecting the picture upon the card and copying the lip movement upon the same side from which the picture is projected, but by copying the lip movement on the reverse side the artist does not cast a shadow on the picture he is copying.

After the lip movement has been copied from each frame of the master film 10 upon a plurality of the cards 27 the desired animated figure or cartoon is drawn on the cards and a negative and positive animated talking film made in the same manner as previously described.

In Figs. 10 and 11 I have shown still another method for copying the lip movement from a master film. With this method each frame of a master film is enlarged upon a card 35. These cards are similar to the cards 14 including gauge holes 36 and a frame space 37. After each frame of the master film has been enlarged upon the cards 35 the lips of the character in the picture on each card are traced over with an indelible ink as indicated at 38. The cards 35 are then washed in a solution which removes all of the photograph except the traced lips 38 as shown in Fig. 11. The desired animated character or cartoon is then filled in to match the lip movement of each card 35 and a negative and positive animated talking motion picture film is produced in the manner previously described.

In Figs. 12 and 13 I show another method of copying the lip movement from the cards 35. In this method the cards are placed face down on a transparent or translucent member 39 positioned over a light 40. The light 40 projects the image through the card 35 and the lips of the image are copied on the reverse side of the card as indicated at 41. An animated figure or cartoon is then drawn on each of the cards 35 to match the lips 41 as shown in Fig. 13 and a negative and positive talking animated motion picture film is produced in the same manner as previously described.

It will be understood that portions of the figure on the master film other than the lips may be copied when desired and that the copied lips need not be those of a human but may be those of an animal copied so that when the complete animated film is projected the animal will be talking in a human voice and its lips or mouth action will synchronize with the voice.

Sounds other than a human voice such as an explosion, a whistle blast, etc., may be incorporated in an animated talking motion picture in the same manner as described regarding the voice.

When my invention is used in connection with a system of talking motion pictures wherein a record is used the original record is used when the animated film is projected or if only parts of the original record are required those parts are recorded on another record which is then synchronized with the animated film in the usual way.

My invention may also be employed when puppets are used for animated characters. When the puppets are used a moving picture of a person is taken the same as described relative to the first method, and the film is projected one frame at a time on a screen similar to the manner shown in Fig. 2. The lips of the puppets are then placed in a position to correspond to the lips of the person in the projected frame. The puppet may then be either photographed on a card similar to the cards 14 or it may be photographed on one frame of a negative motion picture film. After the puppet has been photographed on a negative film the voice chart is printed thereon and a positive film made therefrom in the same manner as previously described.

From the foregoing description it will be apparent that I have provided a method whereby sound may be synchronized with an animated picture to produce an animated talking motion picture which is simple, inexpensive and highly efficient in results.

Having thus described my invention, I claim:

1. The method of producing animated talking motion pictures comprising projecting a picture of a sound producing subject on a motion picture film including a sound track of said subject one frame at a time and copying the action of the sound producing portion of the subject of each projected frame upon individual cards, one card for each frame of said film used, drawing an animated figure or cartoon on said cards to include the sound producing portion on each of said cards, then photographing said cards upon a motion picture film, one card to a frame to produce an animated film, then matching said first film with said animated film and printing said sound chart on said animated film.

2. The method of producing animated talking motion pictures comprising projecting a picture of a person on a motion picture film including a voice track of said person, copying the lip movement of the person of each frame upon individual cards, drawing an animated figure or cartoon on said cards, said figure including the copy of the lip movement on each of said cards, then photographing said cards upon a motion picture film, then matching said first film with said animated film and printing said voice track on said animated film.

3. The method of producing animated talking motion picture films comprising making a motion picture film of a person, registering said person's voice on a voice track on said film, projecting said film one frame at a time and copying the lip movement of the person of each projected frame upon individual cards, one car for each frame of said film used, drawing an animated figure or cartoon on said cards including the representation of the lip movement on each of said cards, then photographing said cards upon a motion picture film, one card to a frame to produce an animated film, then matching said first film with the animated film and printing said voice chart on said animated film.

4. The method of producing animated talking motion picture film comprising photographing a person on a motion picture film, registering said person's voice on a voice track on said film, projecting said film one frame at a time onto a plurality of cards, one card for each frame of said film, tracing the corresponding lip movement of the person of each projected frame on said cards, then drawing an animated figure or cartoon on said cards to correspond to include the lip movement on each of said cards, then photographing said cards on a motion picture film, one card to a frame, matching said first film with said last film and printing said sound track on said last film.

5. The method of producing animated talking motion pictures comprising photographing a person on a negative motion picture film, registering said person's voice on a voice track on said negative film, making a master positive film from said negative, said master positive film including said voice track from said negative, projecting said master positive film one frame at a time onto a plurality of cards, one card for each frame of said film, tracing the lip movement of the person of each projected frame on said cards then drawing an animated figure or cartoon on said cards to correspond to and include the lip movement of each of said cards, photographing said cards on a negative motion picture film, one card to a frame, then matching said master positive film with said animated negative film and printing said voice track on said animated negative film and then printing a positive motion picture film including said voice track from said animated negative film.

6. The method of producing talking moving pictures comprising a step of projecting a picture film of a sound producing subject having a sound track thereon, one frame at a time, producing a series of animated figures or cartons, each one of the series corresponding to a projected frame, making a portion of each figure or cartoon by copying the action of the sound producing portion of the subject of the corresponding projected frame, photographing the series of completed cartoons or figures on a motion picture film, matching said first named film with said last named film and printing the sound track on said last named film.

7. The method of producing sound synchronized animated cartoon films, which method consists in making a series of motiton pictures on a film, and simultaneously producing a sound record synchronized with said motion pitcures and which is to accompany the cartoon film, examining each frame of said motion picture film, producing as many cartoon drawings as there are frames in the motion picture film, with a sound depicting drawing for each sound depicting frame of the motion picture film, then photographing each of said cartoon drawings on a separate frame of an unexposed motion picture film, the location in the finished cartoon film of those frames depicting sound-producing action corresponding to the location in the first-mentioned motion picture film of those frames depicting sound-producing action whereby the finished film is associated with the sound record for projection of the caricatured sound depicting action in synchronization with reproduction of the sound.

NED H. MANN.